(12) United States Patent
Jang (10) Patent No.: US 8,334,919 B2
(45) Date of Patent: Dec. 18, 2012

(54) APPARATUS AND METHOD FOR DIGITAL PHOTOGRAPHING TO CORRECT SUBJECT AREA DISTORTION CAUSED BY A LENS

(75) Inventor: Sung-kyu Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 12/765,071

(22) Filed: Apr. 22, 2010

(65) Prior Publication Data

US 2011/0074982 A1 Mar. 31, 2011

(30) Foreign Application Priority Data

Sep. 29, 2009 (KR) ........................ 10-2009-0092468

(51) Int. Cl.
*H04N 5/217* (2006.01)
*H04N 5/222* (2006.01)
*G06K 9/40* (2006.01)
*G06K 9/32* (2006.01)

(52) U.S. Cl. .................. 348/333.03; 348/241; 382/275; 382/293

(58) Field of Classification Search .................. 348/241, 348/208.14; 382/275
See application file for complete search history.

(56) References Cited

U.S. PATENT DOCUMENTS

| 7,466,356 | B2 * | 12/2008 | Hofer ...................... 348/333.02 |
| 2007/0065014 | A1 * | 3/2007 | Owechko et al. ............. 382/293 |
| 2008/0239107 | A1 * | 10/2008 | Cho .............................. 348/241 |
| 2009/0304301 | A1 * | 12/2009 | Hattori ......................... 382/275 |
| 2010/0265365 | A1 * | 10/2010 | Oshita .......................... 348/241 |
| 2011/0249153 | A1 * | 10/2011 | Hirooka et al. ............... 348/241 |

FOREIGN PATENT DOCUMENTS

| JP | 2005123693 A | * | 5/2005 |
| JP | 2008118387 A | * | 5/2008 |

* cited by examiner

*Primary Examiner* — John Villecco
(74) *Attorney, Agent, or Firm* — Drinker Biddle & Reath LLP (57) ABSTRACT

A digital photographing apparatus is provided that includes: a lens unit through which image light is transmitted; an image capturing unit for converting the image light transmitted through the lens unit into an image signal; a subject detection unit for detecting a subject from the image signal of the image capturing unit to designate a subject area; a distortion correction unit for converting the image signal into a correction image signal for correcting distortion of the image light caused due to the lens unit, after the subject detection unit has detected the subject; and a subject area converting unit for designating a corrected subject area corresponding to the subject area from the correction image signal.

9 Claims, 7 Drawing Sheets

APPARATUS AND METHOD FOR DIGITAL PHOTOGRAPHING TO CORRECT SUBJECT AREA DISTORTION CAUSED BY A LENS

CROSS-REFERENCE TO RELATED PATENT APPLICATION

This application claims the benefit of Korean Patent Application No. 10-2009-0092468, filed on Sep. 29, 2009, in the Korean Intellectual Property Office, the disclosure of which is incorporated herein in its entirety by reference.

BACKGROUND

The present invention relates to an apparatus and method for digital photographing, and more particularly, to an apparatus and method for digital photographing, whereby a face of a person or a movement of a subject is detected from an image signal generated by an image capturing unit and image distortion caused due to a lens unit is corrected at high speed.

Recently, various functions that satisfy user demands have been installed in digital cameras. For example, a wide-angle lens for taking photographs of landscapes or other wide-angle situations is normally installed in latest generation digital cameras. Also, a face detection function for automatically detecting a face of a person and displaying the same or a function for automatically detecting a movement of a subject is frequently used in digital cameras.

In digital cameras using wide-angle lenses, image distortion generated due to a lens needs to be corrected. However, when correction of image distortion generated due to a lens and a face detection function are performed at the same time, processing thereof takes a long time. After correcting image distortion, the detecting of a face or movement of a subject are performed by using the corrected image. That is, since the amount of data processing is significantly increased, software operations become complicated, thereby consuming a lot of the capacity of a main memory and processor. Thus, it is difficult to operate a control system of the digital camera.

SUMMARY

The present invention provides an apparatus and method for digital photographing, whereby a face of a person or a movement of a subject is detected from an image signal generated by an image capturing unit to designate a subjection area and then image distortion caused due to a lens unit is corrected.

According to an aspect of the present invention, there is provided a digital photographing apparatus comprising: a lens unit through which image light is transmitted; an image capturing unit for converting the image light transmitted through the lens unit into an image signal; a subject detection unit for detecting a subject from the image signal of the image capturing unit to designate a subject area; a distortion correction unit for converting the image signal into a correction image signal for correcting distortion of the image light caused due to the lens unit, after the subject detection unit has detected the subject; and a subject area converting unit for designating a corrected subject area corresponding to the subject area from the correction image signal.

The subject detection unit may comprise a face detection unit for recognizing a face and designating the subject area to comprise the recognized face.

The subject detection unit may comprise a movement detection unit for recognizing a movement of the subject and designating the subject area to comprise the recognized subject.

The subject area may comprise a rectangle, and the subject area converting unit converts positions of two points on a diagonal of the subject area based on distortion correction performed by the distortion correction unit, and designate a rectangular area comprising the two converted points as the corrected subject area.

The subject area may comprise a rectangle, and the subject area converting unit converts positions of four points of the subject area based on distortion correction performed by the distortion correction unit, and designates a rectangular area comprising the four converted points as the corrected subject area.

The digital photographing apparatus may further comprise a storage unit for storing the image signal after the subject area is designated by the subject detection unit, and the distortion correction unit may read the image signal stored in the storage unit to perform distortion correction.

According to another aspect of the present invention, there is provided a method of photographing an image, the method comprising: capturing an image by converting image light transmitted through a lens unit into an image signal; detecting a subject by detecting a subject from the image signal to designate a subject area; correcting distortion by converting the image signal into a correction image signal to correct distortion of image light caused due to the lens unit; and converting the subject area by designating a corrected subject area from the correction image signal corresponding to the subject area.

According to the apparatus and method for digital photographing of the present invention, a face of a person or a movement of a subject is detected from an image signal generated by an image capturing unit to designate a subjection area and image distortion caused due to a lens unit is corrected. Accordingly, detection of a subject and correction of image distortion may be performed simultaneously at high speed.

Also, only a portion of data of the subject area that is designated by detecting a face or a movement of a subject is converted based on the image distortion correction, and thus a corrected subject area may be quickly designated in the distortion-corrected image. Thus the amount of data processing may be significantly reduced, thereby reducing the load of a system.

A computer program product, may also be provided comprising a computer usable medium having a computer readable program code embodied therein, said computer readable program code adapted to be executed to implement the method(s) for photographing an image described above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described in detail by explaining preferred embodiments of the invention with reference to the attached drawings.

Figure 1:
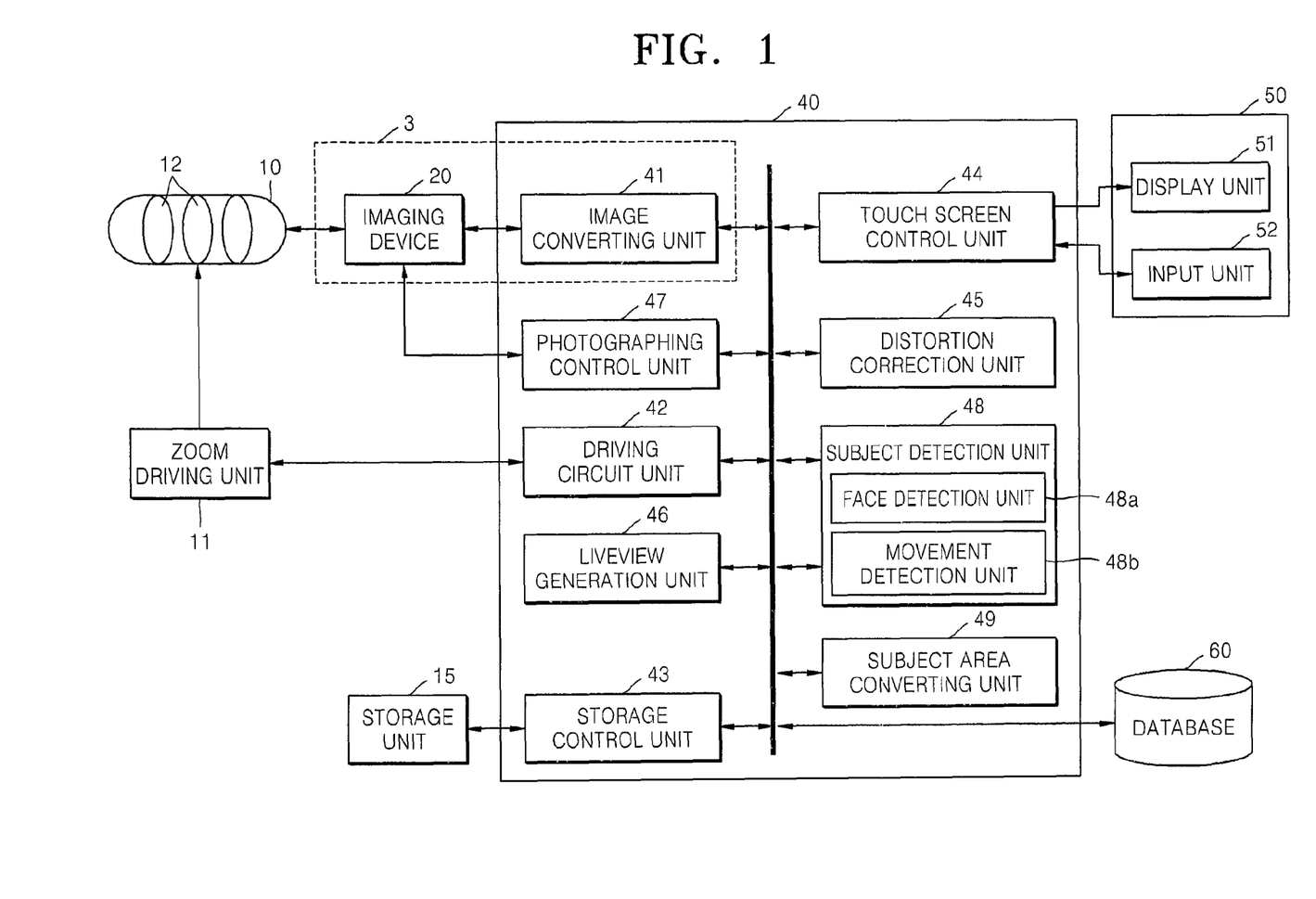
FIG. 1 is a block diagram illustrating the relationships among elements of a digital photographing apparatus according to an embodiment of the present invention.

FIG. 1 is a block diagram illustrating the relationships among elements of a digital photographing apparatus according to an embodiment of the present invention.

Referring to FIG. 1, the digital photographing apparatus according to the present embodiment includes a lens unit 10 through which image light is transmitted, an image capturing unit 3 for converting the image light into an image signal, a subject detection unit 48 for detecting a subject, a distortion correction unit 45 for correcting distortion, and a subject area converting unit 49 for designating a corrected subject area.

By using the digital photographing apparatus according to the present embodiment, the subject detection unit 48 may immediately detect a subject from an image signal of the image capturing unit 3 before performing distortion correction by using the distortion correction unit 45, and thus face detection or detection of a movement of a subject may be performed at high speed with the distortion correction.

The image capturing unit 3 includes an imaging device 20 for photographing an image of a subject and converting the image into an electrical signal, and an image converting unit 41 for converting the electrical signal into an image signal.

The imaging device 20 may be a photoelectric conversion device such as a charge coupled device (CCD) or a complementary metal oxide semiconductor (CMOS) that converts image light transmitted through the lens unit 10 into an electrical signal. The imaging device 20 is driven by a control signal applied from an imaging control unit 47.

The lens unit 10 includes a plurality of lenses 12 through which image light from the outside is transmitted to form the image light into an image on an imaging plane of the imaging device 20. The plurality of lenses 12 are arranged at variable distances. When the distances between the lenses 12 are varied, a magnification is also varied.

The lenses 12 are driven by a zoom driving unit 11 such that positions of the lenses 12 are changeable. The zoom driving unit 11 has a driving unit such as a zoom motor and is operated by a control signal that is applied from a driving circuit unit 42 of a control unit 40. Accordingly, the zoom driving unit 11 may drive the lens unit 10 such that the lens unit 10 has one of a plurality of magnifications.

The image converting unit 41 performs image processing on an electrical signal of the imaging device 20 or converts the electrical signal into an image signal which is in the form of raw data that may be stored in a storage medium. For example, the image converting unit 41 may convert the electrical signal of the imaging device 20 into RGB data and convert the RGB data into an image signal in the form of raw data such as a YUV signal including a luminance signal (Y) and a chrominance signal (UV).

The control unit 40 is electrically connected to the imaging device 20, the zoom driving unit 11, a storage unit 15, and a touch screen 50, transmits or receives a control signal between these elements in order to control the function of each of the elements, or performs data processing. The control unit 40 includes the image converting unit 41, the driving circuit unit 42, a storage control unit 43, a touch screen control unit 44, a distortion correction unit 45, a liveview generation unit 46, an imaging control unit 43, a subject detection unit 48, and a subject area converting unit 49.

The control unit 40 may be a microchip or a circuit board including a microchip, and each of the elements included in the control unit 40 may be implemented using software installed in the control unit 40 or a microchip.

A process of converting an electrical signal into an image signal by using the image converting unit 41 includes reducing driving noise of the imaging device 20 included in the electrical signal by using a correlation double sampling (CDS) circuit, adjusting a gain of a signal after noise reduction by using an automatic gain control (AGC) circuit, converting an analog signal into a digital signal by using an A/D converter, and performing signal processing such as correction of a pixel defect with respect to a digital signal, gain correction, white balance correction, gamma correction, etc. Alternatively, the CDS circuit, the AGC circuit, and the A/D converter described above may also be separate circuits from the digital photographing apparatus.

The subject detection unit 48 detects a subject from an image signal and designates a subject area. The subject detection unit 48 may directly use an electrical signal—an analog signal may also be referred to as an image signal because the analog signal also indicates an image—or may use an image signal generated by the image converting unit 41 such as a digital signal, RGB data, or a YUV signal.

The subject detection unit 48 may include a face detection unit 48a for detecting a face of a person and a movement detection unit 48b for detecting a movement of a subject.

The face detection unit 48a detects face areas corresponding to faces of persons from an image signal, and designates a subject area including the detected face areas.

Various methods that are well known in the art may be used in detecting a face of a person. For example, a face recognition method using geometrical characteristics of a face may be used. In the face recognition method using geometrical characteristics of a face, geometrical factors such as positions and sizes of characteristic points of a face such as eyes, nose, or mouth, or distances therebetween are used to recognize faces of persons.

The movement detection unit 48b detects a movement of a subject, and designates an area including a moving subject as a subject area.

In a database 60, standard data that is used when the subject detection unit 48 detects a subject may be stored in advance.

The standard data may include, for example, data of geometrical factors such as the positions of characteristic points of a face, the sizes thereof, or distances therebetween, or data related to detection of a movement of the subject. The subject detection unit 48 may recognize a face or a movement of a subject based on the standard data recorded to the database 60.

The subject area that is designated by the subject detection unit 48 is an area that includes a face of a person or an area of a moving subject that is detected from an image to be photographed. The subject area designated by the subject detection unit 48 may be designated as a pixel position on an image signal, and data on the subject area may be stored in the storage unit 15 or may be immediately used by the subject area converting unit 49.

An image signal generated by the image converting unit 41 may be stored in the storage unit 15 by the storage control unit 43. The storage control unit 43 may control recording an image signal in the storage unit 15 and reading of the image signal recorded in the storage unit 15 or setup information.

The storage unit 15 may be a volatile embedded memory. For example, the storage unit 15 may be a semiconductor device such as a synchronous dynamic random access memory (DRAM) that stores a photographed image signal. The storage unit 15 may function as a buffer memory that temporarily stores an image signal generated by the image converting unit 41 or as an operational memory that is used for data processing of the image converting unit 41.

Although not illustrated in FIG. 1, the digital photographing apparatus may include another external memory in addition to the storage unit 15. Examples of the external memory include a flash memory such as a memory stick, SD/MMC, or the like, a storage device such as a HDD, and an optical storage device such as DVD or CD. In the external memory, image files in formats such as a JPEG file, a TIF file, a GIF file, a PCX file, etc, that are photographed by the digital photographing apparatus may be stored.

The touch screen 50 is an input device that replaces a keyboard and a mouse. Desired operations are performed by touching a display surface of the touch screen 50 by hand or using a pen, enabling cognitive operation performance in a graphic user interface (GUI) environment. The touch screen 50 may include a display unit 51 such as a liquid crystal display (LCD) or an organic electroluminescent device (OLED).

An input unit 52 is installed on a surface of the display unit 51 to sense touching on the surface of the display unit 51. The input unit 52 may be a resistance sensing unit, a capacitance sensing unit, a surface sound wave usage sensing unit, an infrared (IR) usage sensing unit, or an optical usage sensing unit.

The user touches the input unit 52 of the touch screen 50 to select a menu from a portion of an image displayed on the display unit 51 to execute the menu or to designate an area to be checked.

After the subject detection unit 48 has detected a subject, the distortion correction unit 45 converts an image signal into a correction image signal to correct distortion of image light caused by the lens unit 10. Distortion correction performed by the distortion correction unit 45 may include modifying an image to reduce the distortion after determining the form of distortion caused by the lens unit 10.

Data related to distortion that may be caused by the lens unit 10 in connection to relative positions of the lenses 12 may be stored in the database 60 in advance. The distortion correction unit 45 modifies an image representing an image signal, with reference to distortion information stored in the database 60. An image signal is converted into a correction image signal by the distortion correction unit 45. A corrected image representing the correction image signal has reduced distortion compared to the original image.

The subject area converting unit 49 designates a corrected subject area corresponding to a subject area in a correction image representing the correction image signal. The subject area designated by the subject detection unit 48 is an area including the detected subject, but in the correction image representing the correction image signal generated by the distortion correction unit 45, the subject area is modified. Accordingly, the subject area converting unit 49 designates a new corrected subject area that includes a subject, according to the converted correction image.

The subject area converting unit 49 may convert a subject area into a corrected subject area through the operations that are used by the distortion correction unit 45 to correct distortion. However, in the current embodiment, the subject area converting unit 49 modifies only some pieces of data of a subject area to designate a corrected subject area in order to reduce time needed in data processing.

The corrected subject area designated by the subject area converting unit 49 includes an area where a subject that is detected in the correction image representing the correction image signal exists. Position data indicating the corrected subject area may be stored in the storage unit 15 or used immediately by the liveview generation unit 46.

The liveview generation unit 46 synthesizes the correction image representing the correction image signal and an auxiliary image representing the corrected subject area generated by the subject area converting unit 49 to generate a liveview image.

The digital photographing apparatus has a live view function that shows a subject to be photographed to the user in real-time. Through the live view function, the image quality of an image to be photographed can be checked just before photographing. Hereinafter, an image that is output using the live view function will be referred to as a "liveview image".

An auxiliary image displayed on a liveview image generated by the liveview generation unit 46 may include, for example, a square box that is displayed superimposed on an area of a recognized face.

Figure 2:
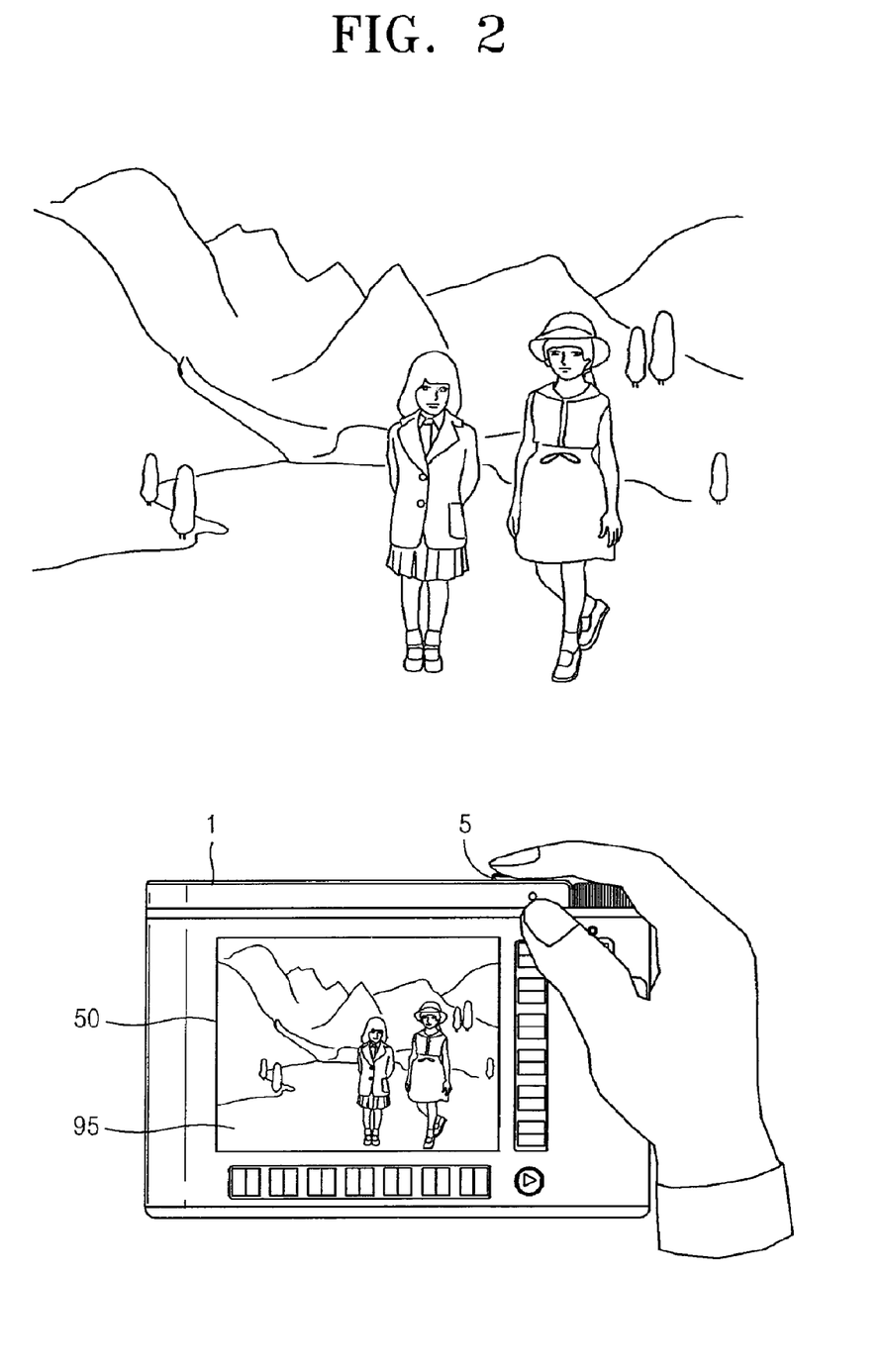
FIG. 2 is a pictorial diagram illustrating an operational state for describing a photographing operation using the digital photographing apparatus of FIG. 1.

FIG. 2 is a pictorial operational state diagram for describing a photographing operation using the digital photographing apparatus of FIG. 1.

The user may set an overall composition for photographing through a full image 95 displayed on the touch screen 50 of the digital photographing apparatus 1 which is in a liveview display mode. When photographing an image with the full image 95, the user may half-press a shutter button 5.

While the shutter button 5 is half-pressed, for example, when the digital photographing apparatus 1 is set as a face recognition mode, a face of a person may be recognized in the full image 95 and a square box displaying the face on the touch screen 50 may be displayed. The liveview display mode may include a series of operations of converting image light captured by the image capturing unit 3 into an image signal, designating a subject area as the subject detection unit 48 detects a subject from the image signal, generating a correction image signal by correcting distortion by using the distortion correction unit 45, and designating a corrected subject area by using the subject area converting unit 49.

Figure 3:
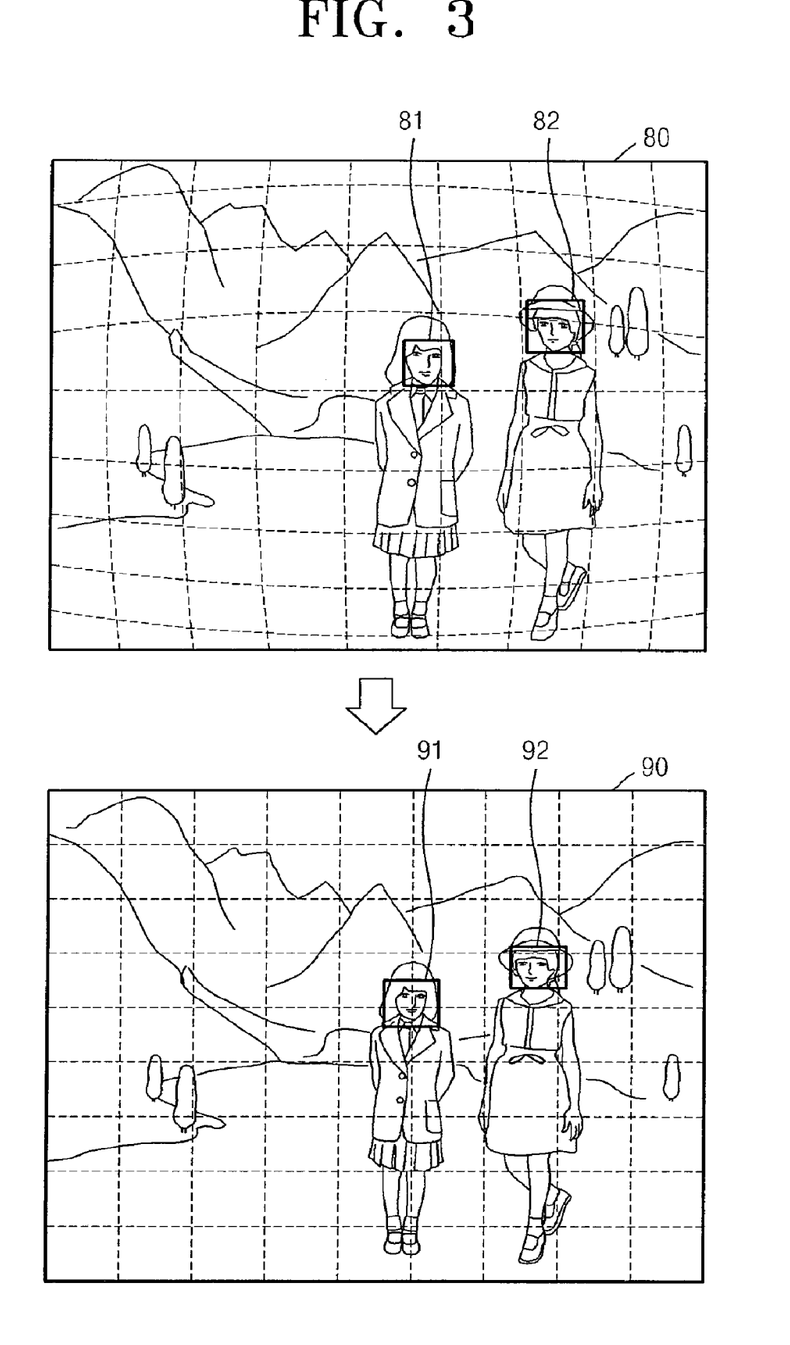
FIG. 3 is a pictorial view for explaining distortion correction that is performed during photographing using the digital photographing apparatus of FIG. 1, according to an embodiment of the present invention.

FIG. 3 is a pictorial view for explaining distortion correction performed during photographing using the digital photographing apparatus of FIG. 1.

A raw image representing an image signal captured and generated by the image capturing unit 3 is a distortion image 80 containing distortion generated by the lens unit 10 as illustrated in the upper diagram of FIG. 3. The subject detection unit 48 detects a face area from the distortion image 80 and designates subject areas 81 and 82 including the detected face area.

The distortion image 80 is converted into a correction image 90 by the distortion correction unit 48, wherein the distortion of the correction image 90 is corrected. The correction image 90 is an image representing a correction image signal generated by the distortion correction unit 45. In the correction image 90, corrected subject areas 91 and 92 which are generated by the subject area converting unit 49 are displayed with square boxes.

Figure 4:
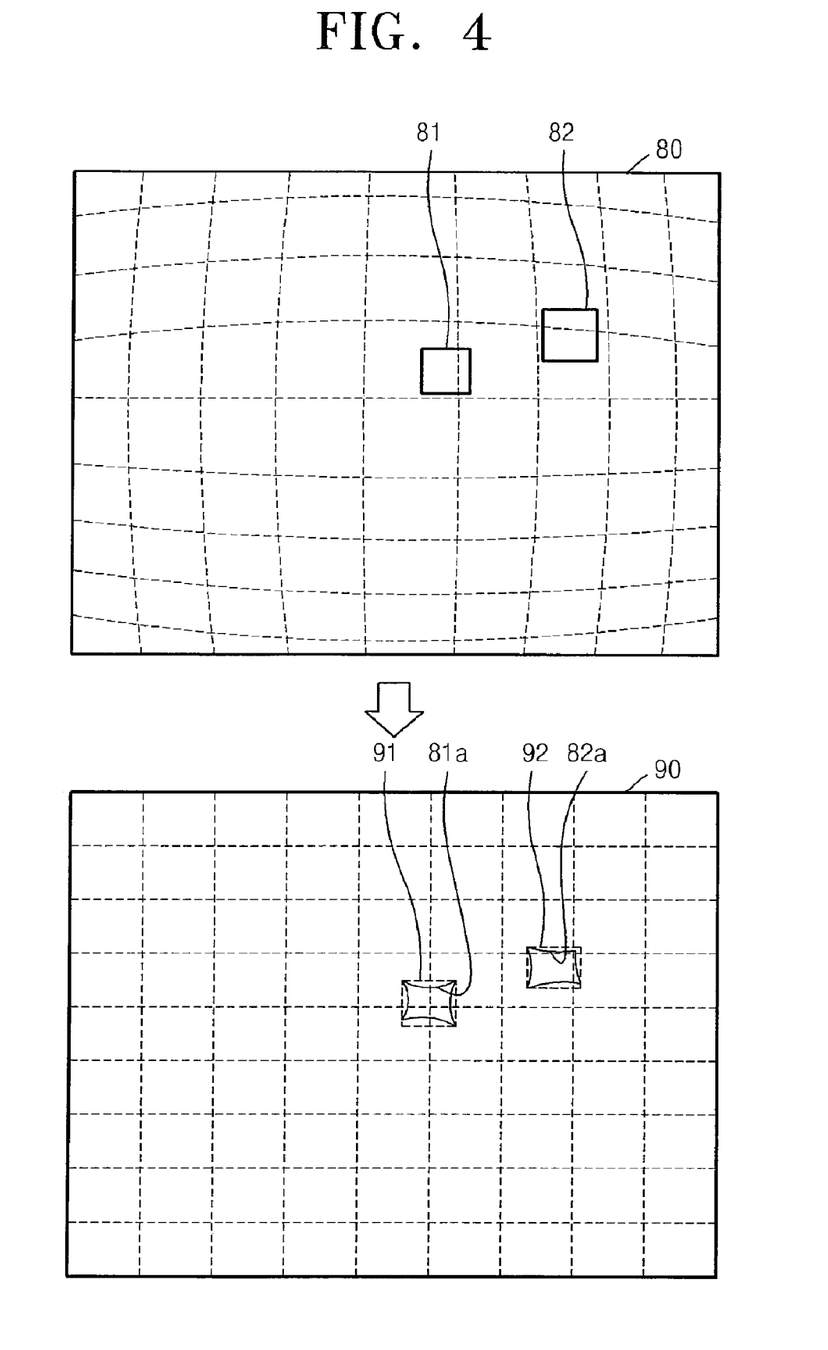
FIG. 4 is a pictorial view for explaining conversion of a subject area that is performed together with the distortion correction of FIG. 3, according to an embodiment of the present invention.

FIG. 4 is a pictorial view for explaining conversion of a subject area that is performed together with the distortion correction of FIG. 3. In FIG. 4, portions of an image except the subject area are omitted to explain a concept of conversion of the subject area.

The subject areas 81 and 82 which are designated by the subject detection unit 48 by detecting subjects from the distortion image 80 are squares, but in the correction image 90 generated by the distortion correction unit 45, areas 81a and 82a corresponding to the subject areas 81 and 82 have distorted forms. The subject area converting unit 49 may designate new corrected subject areas 91 and 92 such that they respectively include the areas 81a and 82a having the distorted forms as described above.

Figure 5:
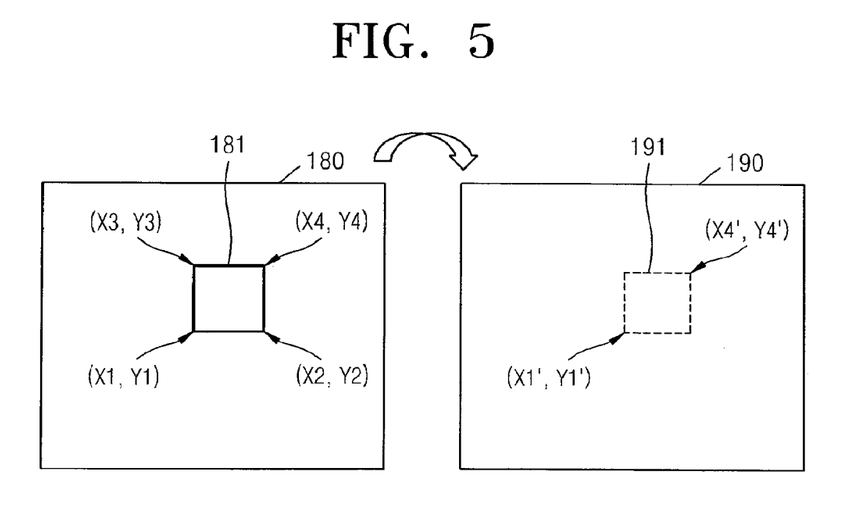
FIG. 5 is a pictorial conceptual diagram illustrating an example of conversion of a subject area that is performed during photographing using the digital photographing apparatus of FIG. 1, according to an embodiment of the present invention.

FIG. 5 is a pictorial conceptual diagram illustrating an example of conversion of a subject area that is performed during photographing using the digital photographing apparatus of FIG. 1.

A left image of FIG. 5 is a distortion image 180 representing an image signal generated by the image capturing unit 3. A rectangle formed by four points (X1, Y1), (X2, Y2), (X3, Y3), and (X4, Y4) marked on the distortion image 180 indicates a subject area 181 that is designated after the subject detection unit 48 has detected a subject.

A right image of FIG. 5 is a correction image 190 representing a correction image signal generated by the distortion correction unit 45. A corrected subject area 191 having a rectangular shape formed by two points (X1', Y1'), and (X4', Y4') constituting two points of a diagonal of the rectangle is displayed on the correction image 190.

The subject area converting unit 49 generates two conversion points (X1', Y1') and (X4', Y4') of a corrected subject area by converting the two points (X1, Y1) and (X4, Y4) connecting the diagonal of the subject area included in the distortion image 180 based on correction performed by the distortion correction unit 45. In detail, the conversion points (X1', Y1') and (X4', Y4') may be generated by using a conversion function f below.

$$(X1', Y1') = f(X1, Y1, Pc)$$

$$(X4', Y4') = f(X4, Y4, Pc) \qquad \text{<Equation 1>}$$

In Equation 1, a variable Pc input to the conversion function f is a relative position of a lens or a lens distortion parameter that is set in advance according to the type of the lens unit 10.

When the subject area converting unit 49 generates the corrected subject area 191 denoting a position of a subject on the correction image 190 as described above, there is no need to convert all the pixels of the subject area 181 in the distortion image 180—just two points (X1, Y1) and (X4, Y4) need to be converted.

Figure 6:
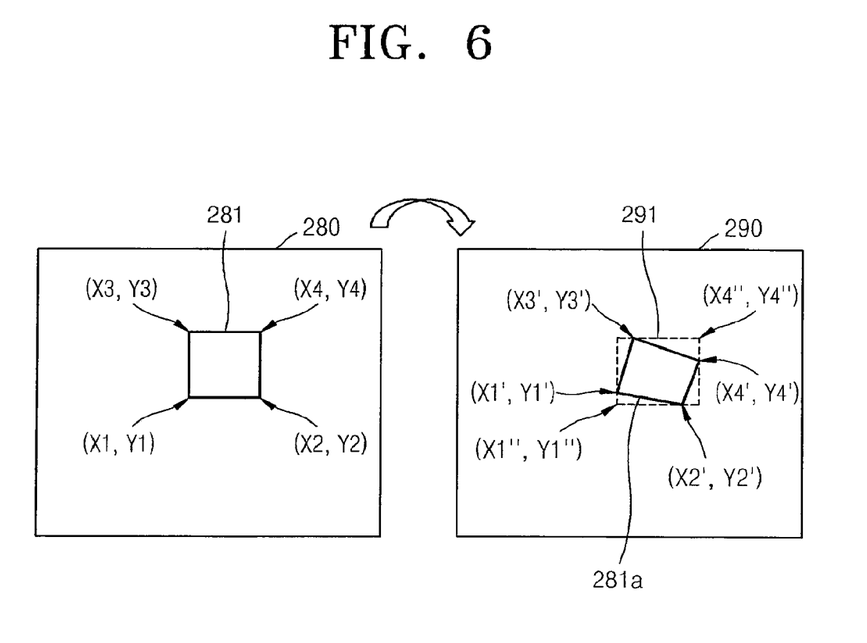
FIG. 6 is a pictorial conceptual diagram illustrating another example of conversion of a subject area that is performed during photographing using the digital photographing apparatus of FIG. 1, according to an embodiment of the present invention.

FIG. 6 is a pictorial conceptual diagram illustrating another example of conversion of a subject area that is performed during photographing using the digital photographing apparatus of FIG. 1.

A left image of FIG. 6 is a distortion image 280 representing an image signal generated by the image capturing unit 3. A rectangle formed by four points (X1, Y1), (X2, Y2), (X3, Y3), and (X4, Y4) marked on the distortion image 280 indicates a subject area 281 that is designated after the subject detection unit 48 has detected a subject.

A right image of FIG. 6 is a correction image 290 representing a correction image signal generated by the distortion correction unit 45. A corrected subject area 291 having a rectangular shape formed by two points (X1", Y1"), and (X4", Y4") constituting two points of a diagonal of the rectangle is displayed on the correction image 290.

The subject area converting unit 49 generates four conversion points (X1', Y1'), (X2', Y2'), (X3', Y3'), and (X4', Y4') by converting the four points (X1, Y1), (X2, Y2), (X3, Y3), and (X4, Y4) respectively connecting the diagonals of the subject area 281 included in the distortion image 280 based on correction performed by the distortion correction unit 45. In detail, the four conversion points (X1', Y1'), (X2', Y2'), (X3', Y3'), and (X4', Y4') may be generated by using a conversion function f represented in Equation 1 below.

By connecting the four conversion points (X1', Y1'), (X2', Y2'), (X3', Y3'), and (X4', Y4') of the correction image 290, as illustrated in FIG. 6, a distorted polygon area 281a is formed instead of the rectangle in the left image of FIG. 6. The subject area converting unit 49 may designate the corrected subject area 291 to cover the distorted polygon area 281.

The corrected subject area 291 is designated as a rectangular area including all of the four conversion points (X1', Y1'), (X2', Y2'), (X3', Y3'), and (X4', Y4'). In order to designate the corrected subject area 291 including all of the four conversion points (X1', Y1'), (X2', Y2'), (X3', Y3'), and (X4', Y4'), two points (X1", Y1") and (X4", Y4") are calculated by using conversion functions Cmax and Cmin represented by Equation 2 below.

$$(X1", Y1") = C\min((X1', Y1'), (X2', Y2'), (X3', Y3'), (X4', Y4'))$$

$$(X4", Y4") = C\max((X1', Y1'), (X2', Y2'), (X3', Y3'), (X4', Y4')) \qquad \text{<Equation 2>}$$

A first point (X1", Y1") that is converted using the conversion function Cmin is used to calculate a limit point corresponding to the bottom left point of the four conversion points (X1', Y1'), (X2', Y2'), (X3', Y3'), and (X4', Y4') in the correction image 290.

A second point (X4", Y4") that is converted by the conversion function Cmax is used to calculate a limit point corresponding to the upper right point of the four conversion points (X1', Y1'), (X2', Y2'), (X3', Y3'), and (X4', Y4') in the correction image 290.

The first and second points (X1", Y1") and (X4", Y4") determined by Equation 2 are disposed on the diagonal of the corrected subject area 291 having a rectangular shape including all of the four conversion points (X1', Y1'), (X2', Y2'), (X3', Y3'), and (X4', Y4').

As described above, when the subject area converting unit 49 generates the corrected subject area 291 denoting the position of a subject in the correction image 290, there is no need to convert all of the pixels of the subject area 281 in the distortion image 280; only the four points (X1, Y1), (X2, Y2), (X3, Y3), (X4, Y4) need to be converted.

Figure 7:
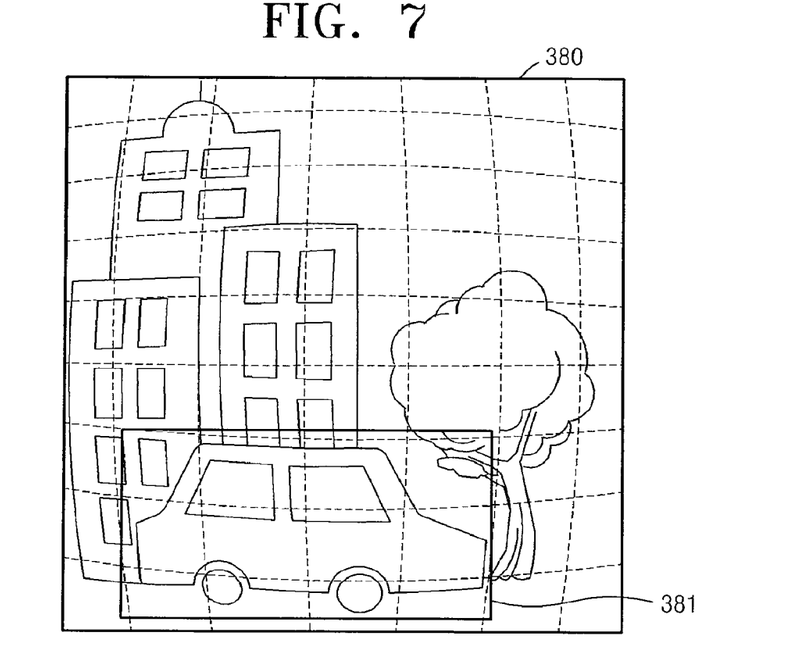
FIG. 7 is a pictorial diagram for explaining an operation of detecting a movement of a subject that is performed during photographing using the digital photographing apparatus of FIG. 1, according to an embodiment of the present invention.
Figure 8:
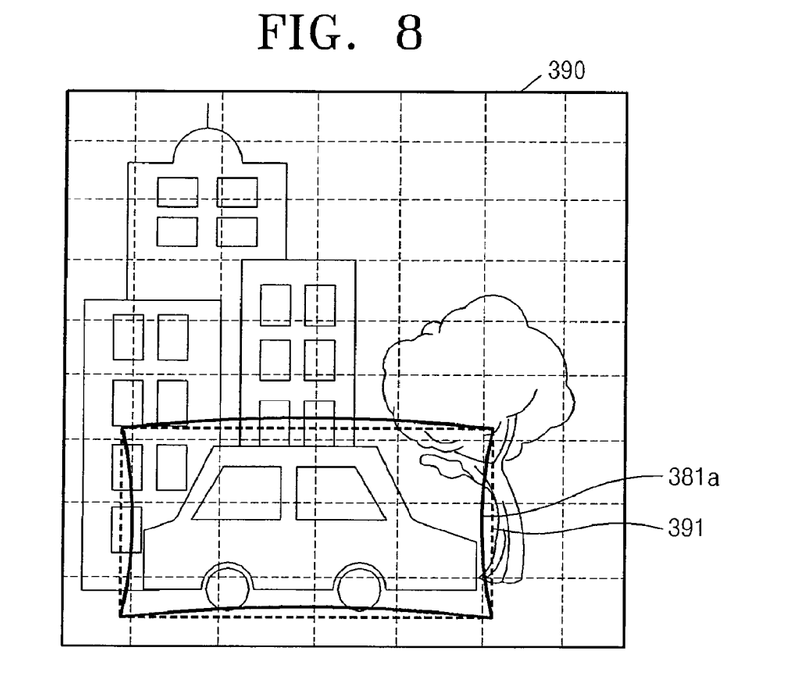
FIG. 8 is a pictorial diagram illustrating conversion of a subject area that is performed with image distortion correction of the image of FIG. 7, according to an embodiment of the present invention.

FIG. 7 is a pictorial diagram for explaining an operation of detecting a movement of a subject that is performed during photographing using the digital photographing apparatus of FIG. 1. FIG. 8 is a conceptual diagram for describing conversion of a subject area that is performed with image distortion correction of the photographed image of FIG. 7.

The image illustrated in FIG. 7 is a distortion image 380 representing an image signal generated by the image capturing unit 3. A subject area 381 that is designated after the subject detection unit 48 has detected a moving subject, is shown using a rectangular box.

The image illustrated in FIG. 8 is a correction image 390 representing an image signal generated by the distortion correction unit 45. The correction image 390 has an area 381a corresponding to the subject area 381 of FIG. 7, but the area 381a has a distorted form and not a rectangular shape. The subject area converting unit 49 converts the positions of the four points of the subject area 381 in the distortion image 380 according to correction performed by the distortion correction unit 45 and designates a rectangular area including the converted four positions of the points as the corrected subject area 391.

Figure 9:
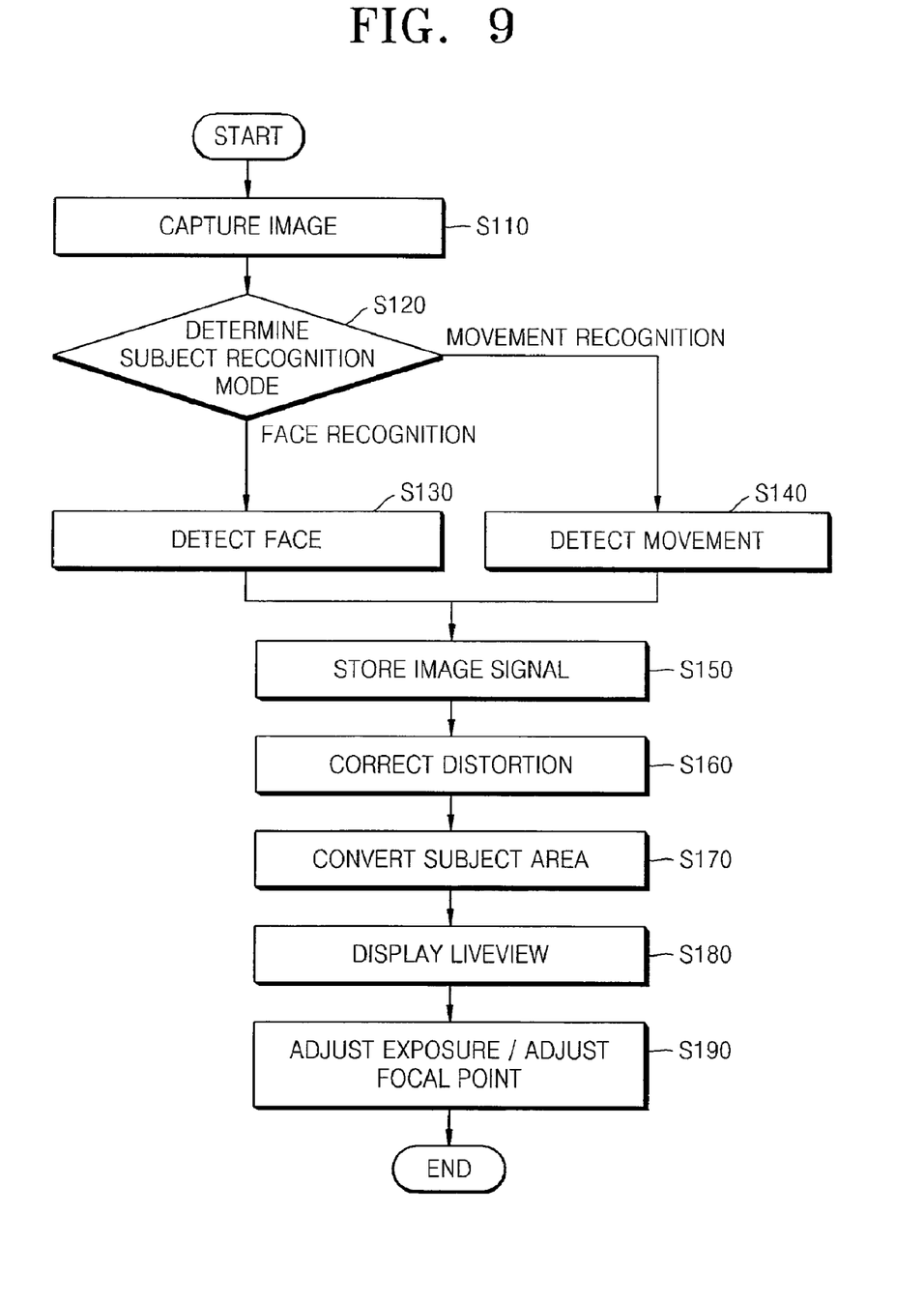
FIG. 9 is a flowchart illustrating a method of photographing an image using the digital photographing apparatus of FIG. 1, according to an embodiment of the present invention.

FIG. 9 is a flowchart illustrating a method of photographing an image by using the digital photographing apparatus of FIG. 1, according to an embodiment of the present invention.

The method includes an operation S110 of capturing an image, in which image light transmitted through a lens unit is converted into an image signal, operations S120, S130, and S140 of detecting a subject, in which a subject is detected from the image signal to designate a subject area, an operation S160 of correcting distortion, in which the image signal is converted into a correction image signal, and an operation S180, in which a corrected subject area corresponding to the subject area is designated using the correction image signal.

In operation S110, image light transmitted through a lens unit is converted into an image signal by using an image capturing unit. A raw image representing the image signal generated in operation S110 is a distortion image that contains distortion generated due to the lens unit.

Operations S120, S130, and S140 of detecting a subject are performed in different ways according to previously set functional modes. That is, the user selects a face recognition mode or a movement recognition mode by manipulating the digital photographing apparatus and a subject recognition mode is determined in operation S120. If the subject recognition mode is a face recognition mode, a face is detected in operation S130, and if the subject recognition mode is a movement recognition mode, a movement of the subject is detected in operation S140.

In operation S130 of detecting a face, a face of a person is recognized from a distortion image representing the image signal to designate a subject area so as to include the recognized face.

In operation S140 of detecting a movement, a movement of a subject is recognized from the distortion image representing the image signal to designate a subject area so as to include the recognized subject.

Next, operation S150 of storing an image signal, in which the generated image signal is stored, may be performed. A storage unit used in operation S150 may be a volatile embedded memory device. For example, the storage unit may be a semiconductor memory device such as a SDRAM and may store the captured image signal.

In operation S160 of correcting distortion, an image signal stored in the storage unit may be read to correct distortion generated due to the lens unit. In operation S170, a corrected subject area corresponding to the subject area is designated on a correction image representing a correction image signal.

The subject area designated in the operations S120, S130, and S140 may be a rectangle, and in operations S170, positions of two points of a diagonal of the subject area are converted based on the distortion correction of operation S160 and a rectangular area including the two converted points may be designated as a corrected subject area.

Alternately, in operation S170, positions of four points of the subject area may be converted based on the distortion correction of operation S160 to designate a rectangular area including the four positions as the corrected subject area.

Next, after operation S170, in operation S180, the correction image representing the correction image signal and an auxiliary image representing the corrected subject area generated in operation S170 are synthesized to display a liveview image. The auxiliary image displayed on the liveview image may include, for example, a square box displayed superimposed on an area of a recognized face.

In operation S190, the digital photographing apparatus may adjust a focal point or exposure with respect to the subject area while displaying the liveview image.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical."

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A digital photographing apparatus comprising:
   a lens unit through which image light is transmitted;
   an image capturing unit for converting the image light transmitted through the lens unit into an image signal;
   a subject detection unit for detecting a subject from the image signal of the image capturing unit to designate a subject area;
   a distortion correction unit for converting the image signal into a correction image signal for correcting distortion of the image light caused due to the lens unit, after the subject detection unit has detected the subject; and
   a subject area converting unit for designating a corrected subject area corresponding to the subject area from the correction image signal, wherein the subject area comprises a rectangle, and the subject area converting unit converts positions of only two points on a diagonal of the subject area based on distortion correction performed by the distortion correction unit, and designates a rectangular area defined by the only two converted points as the corrected subject area.

2. The digital photographing apparatus of claim 1, wherein the subject detection unit comprises a face detection unit for recognizing a face and designating the subject area to comprise the recognized face.

3. The digital photographing apparatus of claim 1, wherein the subject detection unit comprises a movement detection unit for recognizing a movement of the subject and designating the subject area to comprise the recognized subject.

4. The digital photographing apparatus of claim 1, further comprising a storage unit for storing the image signal after the subject area is designated by the subject detection unit, and the distortion correction unit reads the image signal stored in the storage unit to perform distortion correction.

5. A method of photographing an image, the method comprising:
   capturing an image by converting image light transmitted through a lens unit into an image signal;
   detecting a subject by detecting a subject from the image signal to designate a subject area;
   correcting distortion by converting the image signal into a correction image signal to correct distortion of image light caused due to the lens unit; and
   converting the subject area by designating a corrected subject area from the correction image signal corresponding to the subject area, wherein the subject area comprises a rectangle, and in the converting of a subject area, only two points on a diagonal of the subject area are converted according to the distortion correction, and a rectangular area defined by the only two converted points is designated as the corrected subject area.

6. The method of claim 5, wherein the detecting of a subject comprises detecting a face, wherein the subject area comprises the detected face.

7. The method of claim 5, wherein the detecting of a subject comprises detecting a movement, wherein the subject area comprises the detected subject.

8. The method of claim 5, further comprising storing the image signal after detecting the subject, wherein, in the correcting of distortion, the stored image signal is read to perform distortion correction.

9. A computer program product, comprising a non-transitory computer usable medium having a computer readable program code embodied therein, said computer readable program code adapted to be executed to implement at least a method for photographing an image, said method comprising:
   capturing an image by converting image light transmitted through a lens unit into an image signal;
   detecting a subject by detecting a subject from the image signal to designate a subject area;
   correcting distortion by converting the image signal into a correction image signal to correct distortion of image light caused due to the lens unit; and
   converting the subject area by designating a corrected subject area from the correction image signal corresponding to the subject area, wherein the subject area comprises a rectangle, and in the converting of a subject area, only two points on a diagonal of the subject area are converted according to the distortion correction, and a rectangular area defined by the only two converted points is designated as the corrected subject area.

* * * * *